United States Patent [19]

Hapke

[11] 4,456,204
[45] Jun. 26, 1984

[54] DEPLOYABLE INLET FOR AEROPLANE CENTER BOOST ENGINE

[75] Inventor: Donald W. Hapke, Issaquah, Wash.
[73] Assignee: The Boeing Company, Seattle, Wash.
[21] Appl. No.: 306,748
[22] Filed: Sep. 29, 1981
[51] Int. Cl.³ .............................................. B64D 33/02
[52] U.S. Cl. ................................. 244/53 B; 244/58; 244/55
[58] Field of Search .................. 244/53 B, 53 R, 55, 244/58, 57, 12.3, 23 B, 208, 130; 60/263; 98/1.5

[56] References Cited

U.S. PATENT DOCUMENTS

| | | | |
|---|---|---|---|
| Re. 22,595 | 1/1945 | Upson | 244/53 R |
| 3,279,191 | 10/1966 | Keenan | 60/263 |
| 3,469,803 | 9/1969 | Schmielau | 244/55 |

Primary Examiner—Trygve M. Blix
Assistant Examiner—Ivy M. Shum
Attorney, Agent, or Firm—Hughes, Barnard & Cassidy

[57] ABSTRACT

A deployable inlet for use with a center boost engine on a jet propelled aircraft having the capability of aerodynamically fairing the air inlet located in the leading edge of the vertical stabilizer at such times as the center boost engine is shut down and non-operative, thus minimizing drag. More particularly, an inlet construction for use with aircraft of the type commonly employing multiple main power plants and an auxiliary center boost engine of the type which is commonly used only: (i) during take-off; (ii) during air refueling operations; and/or (iii), under certain emergency operating conditions; and, wherein the air inlet for such center boost engine is located at the root leading edge of the aircraft's vertical stabilizer. The stabilizer's lower leading edge quarter chord panels define inlet doors for the air inlet, with such doors completely sealing the inlet and lying in the same general plane as the skin surface of the vertical stabilizer when such doors are in the closed position so as to define a smooth continuous airfoil stabilizer surface. In use, the inlet doors defined by the vertical stabilizer lower leading edge quarter chord panels are opened by pivoting outwardly to form the inlet's highlight and throat geometry; yet, when not in use, the inlet doors define a smooth continuation of the vertical stabilizer aerodynamic surfaces, thereby eliminating the need to dedicate additional structure and/or volumetric storage space for such doors.

14 Claims, 8 Drawing Figures

DEPLOYABLE INLET FOR AEROPLANE CENTER BOOST ENGINE

RELATED APPLICATION

Donald W. Hapke Ser. No. 306,906, filed Sept. 29, 1981, for "Retractable Nozzle Fairing System for Aeroplane Center Boost Engine", now U.S. Pat. No. 4,411,399, issued Oct. 25, 1983.

BACKGROUND OF THE INVENTION

1. Field of the Invention

The present invention relates in general to center boost engines for use with aircraft having multiple main power plants; and, more particularly, to an aeroplane center boost engine of the type mounted within the tail portion of the aeroplane and having a forwardly presented air inlet located in the lower or root portion of the vertical stabilizer's leading edge, and to deployable door means for selectively closing the inlet when the center boost engine is shut down, and for opening the inlet when the center boost engine is in operation---normally during take-offs, air refueling operations, and in certain emergency situations. The type of center boost engine here under consideration is commonly employed in certain military aircraft such, for example, as bombers.

Since center boost engines of the foregoing character are only operated during certain periods of in-flight operation, a need has long existed and has been recognized for providing some means for compensating for and, preferably, for eliminating, the undesired drag that is created by the engine inlet and the exhaust nozzle for such an engine. However, prior to the advent of the present invention, there has been no satisfactory solution to the drag problems created with center boost engines—in large part because the provision of deployable and/or retractable fairing structures has required complex and expensive mechanical configurations which, by their very nature, have required dedication of significant amounts of aircraft structure and volumetric storage space for the fairing components when not in use. Moreover, the use of such additional structural components tends to not only involve complex structure and actuating mechanisms, but, moreover, such proposed arrangements have generally tended to significantly increase the base weight of the aircraft, as well as to increase the very drag components that such systems are intended to minimize. The present invention relates specifically to a simple, yet highly effective, system for overcoming the foregoing problems and for providing an aerodynamically faired deployable inlet for such center boost engines. Those persons interested in the details of an improved retractable fairing system for the exhaust nozzle of such center boost engine installations are referred to the aforesaid copending application, Ser. No. 306,906, filed Sept. 29, 1981 for, "Retractable Nozzle Fairing System for Aeroplane Center Boost Engine", now U.S. Pat. No. 4,411,399.

2. Description of the Prior Art

The use of auxiliary jet propulsion engines which are not intended for continuous use in flight has long been known in the prior art. For example, in U.S. Pat. No. 2,810,534-Fandeux, the patentee discloses the use of an auxiliary engine carried within a streamlined nacelle mounted beneath the fuselage of a twin propeller-driven aircraft. Although the nacelle is streamlined, presumably to reduce drag, the patentee does not discuss the desirability of being able to selectively open and/or close the auxiliary engine air inlet or the exhaust nozzle.

Another early patent of general interest is U.S. Pat. No. 2,557,522-Vautier, which, although not relating to the use of an auxiliary engine, is of interest for its disclosure of a pair of engines mounted within the fuselage and provided with air through a centrally disposed air inlet mounted on the upper surface of the aircraft fuselage forward of the vertical stabilizer. The patentee does not disclose any means for selectively opening or closing either the air inlet or the exhaust nozzle.

U.S. Pat. No. 3,237,891-Wotton, discloses an aircraft propelled by three turbo-fan engines, one of which is disposed within the engine fuselage beneath the vertical stabilizer, and the other two of which are mounted outboard of the engine fuselage. No reference is made as to the contemplated use of the centrally disposed engine as a "center-boost" or auxiliary jet engine. The central engine is supplied with air through an air inlet mounted forward of, and at the root of, the vertical stabilizer. No provision is made for selectively opening or closing either the air inlet or the exhaust nozzle.

Other patents of general interest are U.S. Pat. Nos. 3,134,561-Clejan, and 4,130,258-Fox. Each of these patents disclose aircraft having auxliary power units which are retractably mounted so that they can be retracted into the aircraft fuselage when not in use.

A further disclosure of general interest is that contained in U.S. Pat. No. 3,109,610-Quenzler et al, a patent assigned to the assignee of the present invention. This patent discloses an aircraft having three jet engines, one of which is mounted within the fuselage and the other two of which are mounted outboard thereof. The central engine is provided with a centrally located air inlet scoop along the bottom longitudinal axis of the fuselage. The patentees are here principally concerned with the problems associated with ingestion of foreign material into the central engine; and, to inhibit this, they provide a pivoted flap at the forward end of the air scoop. However, such flap is intended only to inhibit entry of foreign material into the air scoop and is not intended to, nor capable of, closing off the air inlet or minimizing drag. Again, no provision is made in this patent for closing the center engine exhaust nozzle so as to minimize drag.

Keenan et al U.S. Pat. No. 3,279,191 describes an aircraft gas turbine power plant comprising a main engine having a main centrally located air intake and a pair of auxiliary engines located outboard thereof. The air inlets to the auxiliary engines communicate with the main engine air inlet; and, pivoted doors are provided for closing the auxiliary air inlets when the auxiliary engines are not in use.

U.S. Pat. No. 3,489,377-Pearson et al discloses an arrangement wherein an aircraft is provided with two outboard main propulsion engines and a centrally located auxiliary gas turbine engine. The center auxiliary engine is provided with a pair of air inlets and a pair of alternatively usable exhaust gas outlets, one of which is directed rearwardly and the other of which is directly vertically upward. The air inlets for the center engine are provided with hinged doors which can be opened either inwardly or outwardly and are designed so as to produce minimum drag on the aircraft when the doors are open in flight.

U.S. Pat. No. 3,472,029-Colley, is of interest for its disclosure of an auxiliary engine having a pair of air inlets located within the air inlet for the main engine, and a single downwardly directed exhaust gas outlet. A hinged closure member is provided for closing the exhaust gas outlet when the auxiliary engine is not in use.

Ward U.S. Pat. No. 3,172,623 is of interest for its disclosure of an aircraft having a central main power plant with a forwardly directed, laterally divided, air intake. A pair of streamlined pods are suspended from the delta-shaped wing of the aircraft on either side of the fuselage. Each pod contains a pair of jet engines with one engine in each pair having a forwardly facing air inlet and the other engine in each pair having a rearwardly facing air inlet. Both engines in each pod have coaxial exhaust nozzles with means to direct the exhaust gases vertically downward. The forward ends of each pod are provided with a pair of pivotally mounted doors which are in a closed position when the forward pod engines are not operating and which may be opened like the upper and lower jaws of a mouth when it is desired to operate the forward engines. Similarly, both pods are provided with second pairs of pivotally mounted doors which can be moved between opened and closed positions so as to define air inlet scoops for the rearmost engines in the pods when the doors are open.

Two other references which are of incidental interest are Axiehla et al U.S. Pat. No. 3,592,414 and Tharratt U.S. Pat. No. 2,506,976. The Axiehla et al patent discloses an adjustable tail cone assembly which is located between adjacent variable area jet engine nozzles and which is adjustable to provide a relatively smooth transition zone between the exterior surface of the tail and the nozzles. Tharratt is of interest merely for its disclosure of hinged panels in the aircraft fuselage which may be pivoted to an open position to permit ejection of rockets.

Unfortunately, however, systems of the foregoing types simply have not effectively dealt with, nor solved, the problems of increased drag associated with the air inlet of auxiliary jet engines which are normally inoperative during cruise conditions of the aircraft.

SUMMARY OF THE INVENTION

Accordingly, it is a general aim of the present invention to provide an improved deployable air inlet construction suitable for use with auxiliary engines that overcomes the foregoing disadvantages inherent with known prior art constructions, and which serves to effectively minimize undesirable drag associated with an auxiliary air inlet when the auxiliary engine is inoperative.

In another of its important aspects, it is an objective of the invention to provide a simplified air inlet construction for auxiliary center boost engines including deployable inlet closure members characterized by their ability to close and completely seal the air inlet in the root leading edge of the aircraft's vertical stabilizer when the auxiliary engine is shut down and wherein the closure members lie in the same general planes as the vertical stabilizer's skin surfaces when such closure members are in the closed position; yet, wherein the closure members may be readily pivoted outwardly to form the inlet's highlight and throat geometry.

In one of its more detailed aspects, it is an object of the invention to provide a deployable air inlet structure for an auxiliary aircraft center boost engine which effectively precludes the need to dedicate significant portions of the stabilizer structure and/or volumetric storage space for the deployable closure elements when in either the closed or open position.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Figure 1:
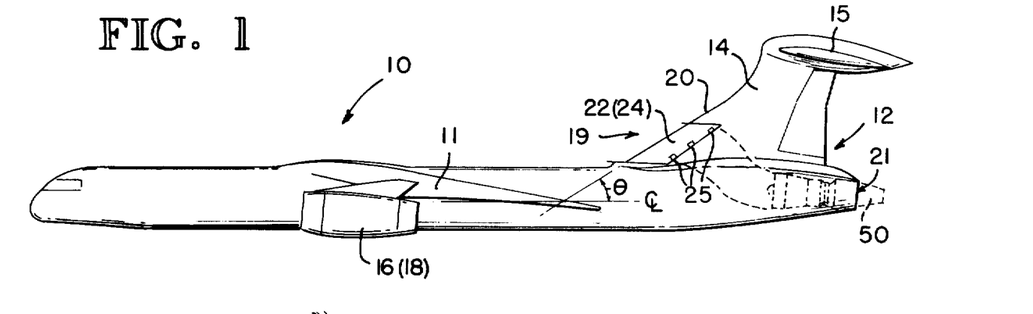
FIG. 1 is a side elevational view of a jet propelled aircraft of the type employing an auxiliary center boost engine mounted in the tail section of the aircraft's fuselage and having an air inlet formed in the lower root portion of the aircraft's vertical stabilizer leading edge.

Turning now to the drawings, there has been illustrated in FIG. 1 an exemplary jet propelled aircraft, generally indicated at 10, of the type having a primary airfoil 11 and an empennage, generally indicated at 12, including a vertical stabilizer 14 and a tail plane 15. The illustrative aircraft 10 is depicted in the drawings as being of the type having a pair of main jet propulsion engines 16, 18 mounted on, and suspended from, the primary airfoil 11 (while only the port engine 16 is visible in FIG. 1, it will be understood by those skilled in the art that the starboard engine 18 would be mounted on, and suspended from, the starboard portion of the primary air foil 11 in the same manner as engine 16). Of course, while the present invention has been illustrated and will herein be described in connection with an aircraft having two main jet propulsion engines 16, 18, it will be appreciated that the invention is not limited to use with twin engine aircraft and might, merely by way of example, find equally advantageous application in multi-engine aircraft employing four or more primary power plants.

As here shown and described, the invention is primarily intended for use with any multi-engine aircraft of the type employing a jet propulsion center boost engine (not shown) for purposes of power assist during take-off, air refueling operations, and/or certain other emergency operating conditions. As such, a typical jet propulsion center boost engine would be conventionally mounted within the empennage body structure 12 of the aircraft 10 and would commonly be provided with an air inlet, generally indicated at 19 and more clearly illustrated in FIG. 3, formed in the lower or root portion of the leading edge 20 of the vertical stabilizer 14. A conventional exhaust nozzle, generally indicated at 21, is provided within the empennage body structure 12 at the rear of the aircraft's main body. As previously indicated, while the present invention is concerned primarily with minimizing, and preferably eliminating, drag associated with the air inlet 19 for the center boost engine when the latter is shut down and inoperative, significant drag is also associated with the exhaust nozzle 21 during most cruise modes of operation; and, provisions for minimizing such undesired drag associated with the exhaust nozzle are more fully set forth in the aforesaid copending application Ser. No. 306,906, filed Sept. 29, 1981, entitled "Retractable Nozzle Fairing System for Center Boost Engine", now U.S. Pat. No. 4,411,399.

In accordance with one of the important aspects of the present invention, provision is made for closing and sealing the air inlet 19 formed in the root portion of the stabilizer leading edge 20 so as to form continuous smooth aerodynamically streamlined stabilizer skin surfaces extending rearwardly from the stabilizer leading edge 20 over the full extent thereof during normal cruise operational modes when the center boost jet engine (not shown) is shut down, thereby substantially eliminating undesired drag by restoring the vertical stabilizer geometry to its normal aerodynamically streamlined configuration and, at the same time, preventing internal icing of the engine during non-operational periods; yet, wherein portions of the stabilizer 14—viz., the port and starboard lower leading edge quarter chord panels—can be easily pivoted outwardly, parting along the lower portion of the leading edge 20 so as to open the air inlet 19 in the stabilizer leading edge 20 with the thus outwardly pivoted stabilizer panels comprising doors or closure members defining the air inlet's highlight and throat geometry. Thus, and as best illustrated by reference to FIGS. 2 and 3 conjointly, it will be observed that the stabilizer's port and starboard lower leading edge quarter chord panels 22, 24, respectively, are each pivotally secured to the stabilizer 14 by any suitable hinge-type pivotal connection such as the exemplary hinge blocks indicated at 25. While only the pivotal connections 25 for the port quarter chord panel 22 are illustrated in the drawings, those skilled in the art will appreciate that the starboard quarter chord panel 24 is pivotally secured to the stabilizer 14 in the same manner. Since the particular pivot or hinge means employed may take various well-known conventional forms, the structural details are not critical to the present invention and are not, therefore, further described in detail.

Figure 6:
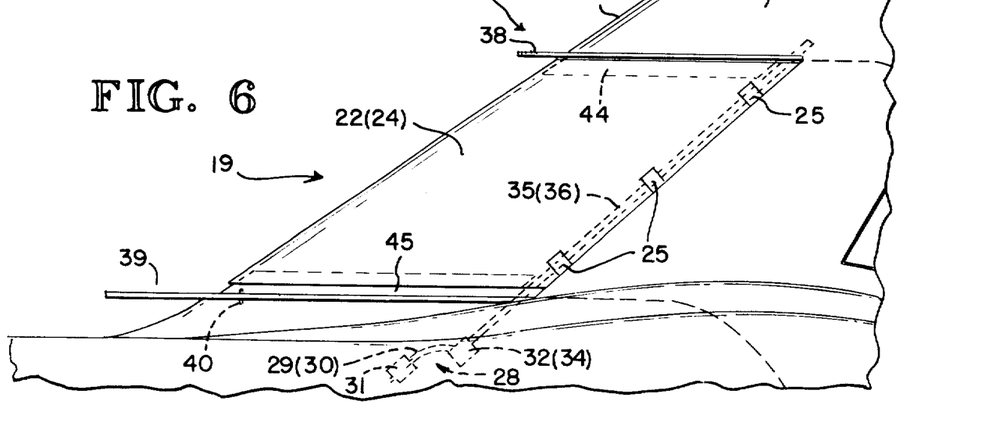
FIG. 6 is a fragmentary side elevational view illustrating in highly generalized fashion exemplary closure member actuating means.

As is conventional with aircraft of the type generally indicated at 10 in FIG. 1, it will be noted that the leading edge 20 of the stabilizer 14 slopes sharply back from the root portion of the stabilizer, defining an acute angle $\theta$ with the longitudinal centerline of the aircraft, such angle $\theta$ commonly being substantially less than 90°. Consequently, in carrying out the present invention it is preferred that the rearmost edges of the port and starboard leading edge quarter chord panels 22, 24 comprise linear edges which are generally, but not necessarily precisely, parallel to the stabilizer leading edge 20—that is to say, the lower leading edge quarter chord panels 22, 24 are, in the exemplary form of the invention illustrated, substantially trapezoidal in shape when viewed in side elevation, as best illustrated in FIG. 6.

The exemplary construction is such that when the lower leading edge quarter chord panels 22, 24 are pivoted inwardly into a position where their leading edges abut, they form a closed sealed inlet 19 having a parting line 26 (FIG. 2) which is coincident with the leading edge 20 of stabilizer 14. In this position—a position occupied only during normal cruise operational modes of the aircraft 10 when the center boost jet engine is shut down—the lower leading edge quarter chord panels 22, 24 respectively lie in the planes of the port and starboard skin surfaces of the stabilizer 14, thus defining smooth, substantially uninterrupted, continuous, aerodynamically streamlined skin surfaces extending rearwardly from the stabilizer leading edge 20 over the entire extent thereof; and, as a consequence, they serve to substantially eliminate any drag resulting from the presence of an air inlet in the stabilizer leading edge 20 at such times as the center boost jet engine is shut down. At the same time, since the air inlet 19 is totally closed and sealed, undesired icing of the non-operative center boost jet engine is effectively precluded.

Figures 2, 3:
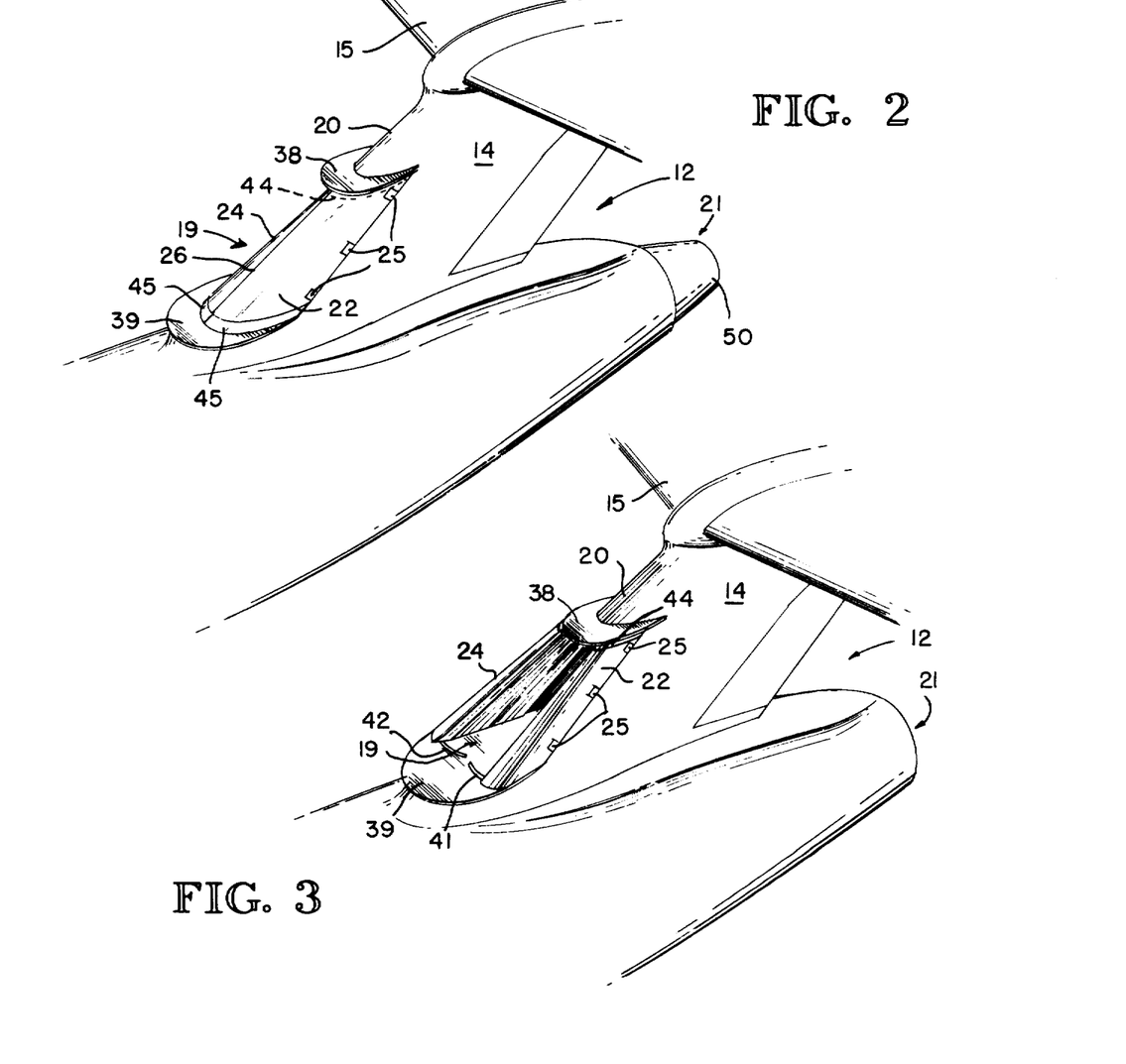
FIG. 2 is an enlarged fragmentary perspective view of the aft portion of the fuselage and empennage of the illustrative aircraft shown in FIG. 1, here illustrating a deployable air inlet embodying the features of the present invention with the inlet closure members here being depicted in the closed position and lying substantially in the planes of the skin surfaces of the vertical stabilizer.
FIG. 3 is an enlarged fragmentary perspective view similar to FIG. 2, but here illustrating the deployable inlet closure members in their outwardly deployed open position —viz., the position occupied when the center boost engine is in its operative running condition.

On the other hand, when the lower leading edge quarter chord panels 22, 24 are pivoted outwardly about the points of pivotal connection 25 to the stabilizer 14 and into the position shwon in FIG. 3—viz., the position occupied when the center boost jet engine is operating during power assist operational modes—the panels 22, 24 part along the parting line 26 (FIG. 2) and are deployed outwardly to define the air inlet 19 in the root leading edge 20 of the stabilizer 14, with the panels 22, 24 thus forming the inlet's highlight and throat geometry.

Thus, it will be apparent that the port and starboard lower leading edge quarter chord panels 22, 24 respectively define port and starboard doors or inlet closure members which, in the closed position (FIG.2) form part of the aerodynamically streamlined stabilizer skin surfaces, and in the deployed position (FIG. 3) comprise doors defining the inlet's highlight and throat geometry. The double door inlet opening width may readily be regulated by the closure actuators dependent upon the throat area requirements.

Figure 7:
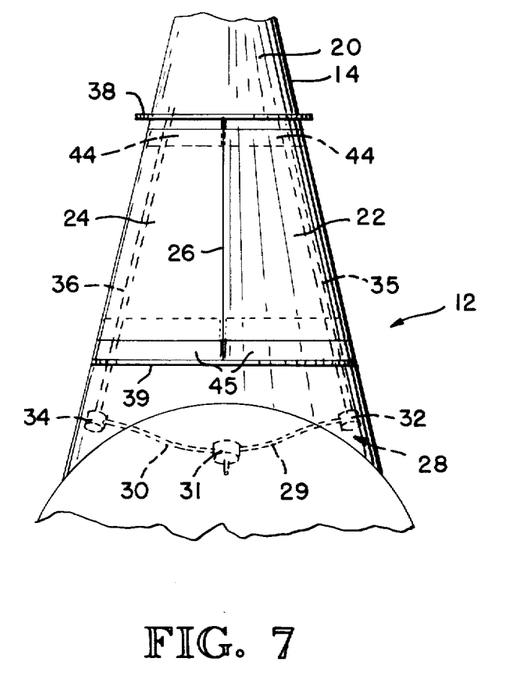
FIG. 7 is a fragmentary elevational view illustrating the deployable inlet closure members in the closed position; and, FIG. 8 is a fragmentary vertical sectional view taken substantially along the line 8—8 in FIG. 4, here illustrating details of the closure element door construction which permits maintenance of a smooth aerodynamic surface at all operative positions of the closure elements.

Referring to FIGS. 6 and 7 conjointly, there has been diagramatically illustrated an exemplary arrangement for pivoting the port and starboard closure members 22, 24 between their closed positions (FIG. 2) and their open positions (FIG. 3). Thus, as here illustrated, conventional rotary actuators, generally indicated at 28, which may take the form of either synchronously driven torque drive motors or synchronously driven flexible drive shafts 29, 30 coupled at their inboard ends to a reversible drive motor 31 and respectively coupled at their outboard ends through port and starboard power hinge gear boxes 32, 34 to port and starboard door actuating shafts 35, 36 extending upward through the rearmost edges of the closure members 22, 24 and, therefore, through the pivot connections or hinge blocks 25. As a consequence of such construction, energization of the drive motor 31 serves to impart the necessary torque to rotate the actuating shafts 35, 36 in opposite directions to synchronously open and/or close the port and starboard closure members 22, 24, with the degree of opening and/or closing movement being a function of the rotational angle through which the actuating shafts 35, 36 are turned and, therefore, a function of the operational cycle of the reversible drive motor 31; thereby enabling the width of the inlet opening to be precisely regulated, and thus controlling the throat area of the air inlet 19 at any desired point between a fully closed inlet (FIG. 2) and a fully open inlet (FIG. 3).

Figure 4:
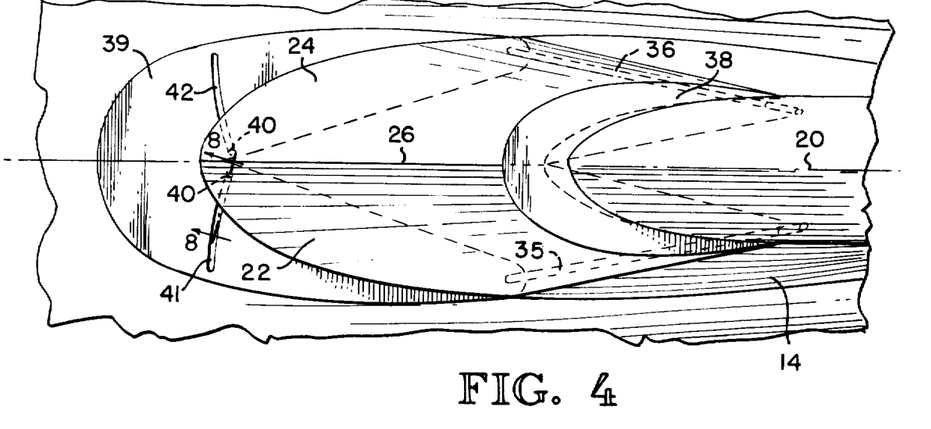
FIG. 4 is an enlarged framentary plan view illustrating the deployable inlet closure members in their closed positions.
Figure 5:
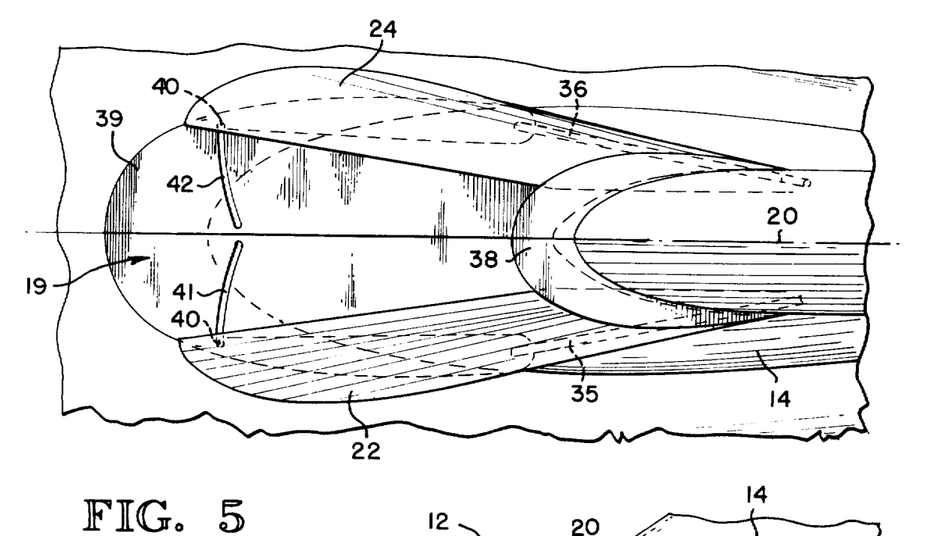
FIG. 5 is an enlarged framentary plan view similar to FIG. 4, but here illustrating the deployable inlet closure members in their open positions.

In keeping with the invention, provision is made for (i) eliminating the formation of gaps between the closure members 22, 24 and the adjacent structural components; (ii) constraining movement of the closure members 22, 24 to minimize flutter; (iii) more precisely defining the air inlet 19 throat surfaces; and (iv), preventing entry of fuselage boundary layer air into the air inlet 19 when the inlet is open. To accomplish this, upper and lower horizontally disposed inlet fences 38, 39, respectively, are mounted on the stabilizer 14 and project both laterally from the port and starboard stabilizer skin surfaces and forwardly from the stabilizer leading edge 20. As best illustrated by reference to FIGS. 4–6 conjointly, it will be observed that the port and starboard closure members 22, 24 are each provided with downwardly projecting pins 40 positioned to project into port and starboard curved grooves or tracks 41, 42 formed in the lower fence 39. Thus, as the closure members 22, 24 are pivoted between fully opened and closed positions, the pins 40 traverse the port and starboard tracks 41, 42 in the lower fence 39 and serve, inter alia, to guide the leading edges of the closure members and to prevent undesired flutter. When the air inlet 19 is open as shown in FIGS. 3 and 5, the lower horizontal fence 39 serves to prevent fuselage boundary layer air from entering the air inlet 19; while the upper and lower fences 38, 39, respectively, define upper and lower air inlet 19 throat surfaces. When the air inlet 19 is closed (FIGS. 2 and 4), the upper and lower fences 38, 39 fair outwardly and define horizontal fences for the vertical stabilizer.

Because of the trapezoidal construction of the port and starboard closure members 22, 24 and the fact that they are pivoted about the axes of rotating actuating shafts 35, 36 which slope rearwardly and define included acute angles with respect to the centerline of the aircraft 10, those skilled in the art will appreciate that as the closure members 22, 24 are pivoted outwardly, for example, the upper edges thereof tend to move downwardly somewhat and away from the upper fence 38, thereby producing undesired gaps between the closure members 22, 24 and the bottom surface of the horizontally disposed upper fence 38. At the same time, the lower edges of the closure members 22, 24 also tend to move downwardly somewhat and into the plane of the lower horizontal fence 39, thus tending to impede outward pivotal movement of the closure members. Therefore, to accommodate unfettered pivotal movement of the closure members 22, 24 and to prevent the formation of undesired gaps between the closure members 22, 24 and the adjacent horizontal surfaces of the fences 38, 39, the closure members are provided with internal telescopically mounted upper and lower door trim blocks 44, 45 respectively. The upper trim blocks 44 are preferably biased upwardly relative to the closure members 22, 24 in any suitable manner (not shown) into substantially gap-free engagement with the lower surface of the upper horizontal fence 38; while the lower door trim blocks 45 are similarly biased downwardly into substantially gap-free engagement with the upper surface of the lower fence 39.

Figure 8:
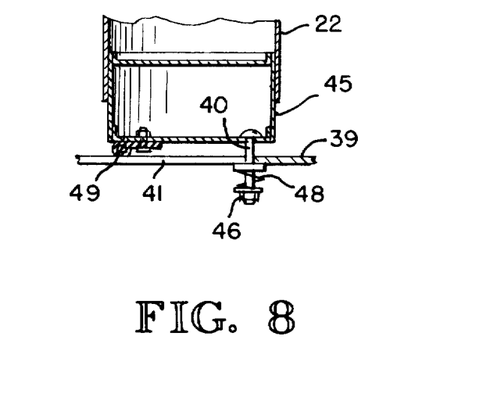

Merely by way of example, and as best illustrated by reference to FIG. 8, there has been illustrated an exemplary biasing arrangement for the lower door trim block 45. Thus, it will be noted that the trim block 45 is slidably and telescopically received within the port lower leading edge quarter chord panel or closure member 22 and is retained in close proximity to the upper surface of the lower fence 39 by means of the pin 40 which traverses the port track 41; the pin 40 here being provided with a fixed stop 46 and spring means 42 interposed between the fixed stop 46 and the lower surface of the horizontal fence 39 for biasing the lower door trim block 45 downwardly towards the lower fence 39 at all operative positions of the closure member 22. If desired, suitable rollers 49 or the like may be provided for facilitating movement of the closure members across the upper surface of the lower fence 39.

In operation, and as best illustrated by reference to FIGS. 2, 3, 6 and 8 conjointly, it will be observed that the closure members 22, 24 are both slightly shorter in vertical height than the vertical distance between the upper and lower fences 38, 39, thereby providing gaps between the lower edges of the closure members and the lower fence 39. As a consequence, when the closure members 22, 24 are fully closed as shown in FIGS. 2, 4 and 6, the upper edges of the closure members 22, 24 are flush with the undersurface of the upper fence 38 and, consequently, the upper door trim blocks 44 are compressed downwardly relative to the closure members by the upper fence 38 against the biasing means (not shown) and are totally contained within the panels defining the closure members 22, 24. At the same time, the pin constraint provided by the pins 40 serves to hold the lower door trim blocks 45 in their lowermost position (FIGS. 2, 6 and 8) with the trim blocks 45 projecting downwardly beneath the door closure members 22, 24 and substantially filling the gaps between the closure members 22, 24 and the upper surface of the lower horizontal fence 39.

As the closure members 22, 24 are pivoted outwardly towards the fully open position (FIGS. 3 and 5), the trapezoidal configuration of the closure members and the rearwardly sloped orientation of the actuating shafts 35, 36, cause the closure members 22, 24 to progressively move downwardly and away from the upper fence 38 and downwardly and towards the lower fence 39. Such downward movement is accommodated by relative telescoping movement between the closure members 22, 24 and the upper and lower door trim blocks 44, 45, respectively; with the upper trim blocks 44 being biased upwardly and remaining in substantially flush engagement with the undersurface of the upper horizontal fence 38 (as best shown in FIG. 3), and the lower trim blocks 45 being moved relatively into the downwardly moving closure members 22, 24. During closing movement of the closure members 22, 24—i.e., movement from the position shown in FIG. 3 to the position shown in FIG. 2—the lower trim blocks 45 progressively move downwardly relative to, and out of, the now upwardly moving closure members 22, 24, while the upper trim blocks 44 progressively move downwardly relative to, and into, the upwardly moving closure members. Thus, in the fully closed position (FIGS. 2, 4 and 6), the lower trim blocks 45 serve to fill the gaps between the closure members 22, 24 and the lower fence 39; in the fully open position (FIGS. 3 and 5), the upper trim blocks 44 fill the gaps between the closure members 22, 24 and the upper horizontal fence 38; and, at all intermediate positions of the closure members 22, 24, the trim blocks 44, 45 both serve to substantially fill the gaps between the closure members 22, 24 and the upper and lower fences 38, 39, respectively.

Although not essential to practice of the present invention, those skilled in the art will appreciate that when the aircraft 10 (FIG. 1) is in a cruise operational mode, undesired drag is associated with both the air inlet 19 and the exhaust nozzle 21 for the then non-operative center boost jet engine (not shown). The present invention eliminates such drag at the air inlet 19, but does not effect the drag characteristics of the exhaust nozzle 21. Accordingly, in the practice of the present invention, it is desirable to include some means for reducing and optimizing the exhaust nozzle's drag characteristics—for example, by the use of a retractable/deployable fairing 50 (FIG. 1) of the type more fully described in the aforesaid copending application Ser. No. 306,906, filed Sept. 29, 1981, now U.S. Pat. No. 4,411,399.

Thus, those skilled in the art will appreciate that there has herein been described a simple, yet highly effective, deployable inlet formed in the root leading edge of a vertical stabilizer which is suitable for use with a center boost jet engine of the type commonly mounted in the aircraft's empennage. The construction readily permits closure of the air inlet to substantially eliminate drag at such times as the center boost jet engine is shut down, since the closure members comprise substantially uninterrupted continuous portions of the aerodynamically streamlined skin surfaces of the stabilizer; and, when closed, undesired icing of the non-operational center boost jet engine is precluded. When the center boost jet engine is to be energized during power assist operational modes, the deployable inlet closure members are pivoted outwardly. During this operational mode, the lower horizontal fence serves to prevent entry of fuselage boundary layer air into the air inlet, while the upper and lower fences, in conjunction with the now opened port and starboard closure members, define the air inlet's highlight and throat geometry. The degree to which the closure members are opened determines the effective throat area of the air inlet.

What is claimed is:

1. In combination with an aircraft having a fuselage; an empennage including an empennage body structure and an upstanding vertical stabilizer mounted on said fuselage and having a leading edge and spaced port and starboard skin panels defining smooth, aerodynamically streamlined skin surfaces extending rearwardly from said stabilizer leading edge; and of the type including an auxiliary center boost jet engine having a rearwardly directed exhaust nozzle mounted within said empennage body structure, an air inlet formed in and coincident with said leading edge of said stabilizer, and an air inlet duct extending from said air inlet to said center boost jet engine and being enclosed wholly within said vertical stabilizer and said empennage body structure; a deployable air inlet comprising:
   (a) port and starboard air inlet closure members respectively formed by lower leading edge quarter chord door panels defining portions of said port and starboard aerodynamically streamlined skin surfaces of said stabilizer;
   (b) said port and starboard air inlet closure members defining a forwardly presented generally vertical parting line coincident with said stabilizer leading edge with said members respectively lying in the planes of said stabilizer port and starboard skin surfaces when in the closed position so as to form smooth aerodynamically streamlined continuations of said port and starboard stabilizer skin surfaces extending rearwardly from said stabilizer leading edge;
   (c) said port and starboard closure members having their rearmost generally vertical quarter chord door panel edges pivotally secured to said stabilizer along lines generally parallel to said stabilizer leading edge and lying in the planes of said port and starboard skin surfaces when in the closed position;
   (d) means for rotating said port and starboard closure members about their pivotal connections to said stabilizer between: (i) a first position wherein the leading edges of said closure members are in abutting sealing relation along said parting line coincident with said stabilizer leading edge so as to close and seal said air inlet when said aircraft is being operated in a cruise operational mode and said center boost jet engine is shut down; and (ii), a second position wherein said port and starboard closure members are pivoted outwardly and in opposite directions from said parting line coincident with said stabilizer leading edge so as to define said air inlet's highlight and throat geometry during power assist operational modes of the aircraft when said center boost jet engine is operational;
   (e) said port and starboard closure members being spaced above the juncture between said vertical stabilizer and said fuselage; and,
   (f) means for precluding entry of fuselage boundary layer air into said air inlet when said port and starboard closure members are in said second position.

2. A deployable air inlet as set forth in claim 1 wherein said port and starboard closure members are substantially trapezoidal in configuration having essentially parallel upper and lower edges with their leading and trailing edges slanted rearwardly and defining acute included angles with the horizontal.

3. A deployable air inlet as set forth in claims 1 or 2 wherein said means for precluding entry of fuselage boundary layer air into said air inlet comprises lower horizontal fence means mounted on said stabilizer immediately below said closure members, upper fence means being mounted on said stabilizer immediately above said closure members, and wherein said closure members and said upper and lower fence means define said air inlet's highlight and throat geometry when said closure members are pivoted outwardly to their deployed second positions.

4. In an aircraft having an empennage including an empennage body structure and an upstanding vertical stabilizer having a leading edge and spaced port and starboard skin panels defining smooth, aerodynamically streamlined skin surfaces extending rearwardly from the stabilizer leading edge, and of the type including an auxiliary center boost jet engine having a rearwardly directed exhaust nozzle mounted within the empennage body structure and an air inlet duct extending from an air inlet formed in the root leading edge of the stabilizer to the center boost jet engine, a deployable air inlet comprising, in combination:

(a) port and starboard air inlet closure members respectively formed by lower leading edge quarter chord door panels defining portions of the port and starboard aerodynamically streamlined skin surfaces of the stabilizer;

(b) said port and starboard air inlet closure members defining a forwardly presented generally vertical parting line coincident with the stabilizer leading edge with said members respectively lying in the planes of the stabilizer port and starboard skin surfaces when in the closed position so as to form smooth aerodynamically streamlined continuations of the port and starboard stabilizer skin surfaces extending rearwardly from the stabilizer leading edge;

(c) said port and starboard closure members having their rearmost generally vertical quarter chord door panel edges pivotally secured to the stabilizer along lines generally parallel to the stabilizer leading edge and lying in the planes of the port and starboard skin surfaces;

(d) upper and lower horizontal fence means mounted on the stabilizer with said upper fence means being positioned immediately above said closure members and said lower fence means being positioned immediately below said closure members, said upper and lower fence means fairing outwardly in a horizontal plane from the stabilizer's skin surfaces and leading edge, whereby said closure members and said upper and lower fence means define said air inlet's highlight and throat geometry and said lower fence means preclude entry of fuselage boundary layer air into said air inlet when said closure members are pivoted outwardly to their deployed positions; and, (e) means for rotating said port and starboard closure members about their pivotal connections to the stabilizer between: (i) a first position wherein the leading edges of said closure members are in abutting sealing relation along said parting line coincident with the stabilizer leading edge so as to close and seal said air inlet when the aircraft is being operated in a cruise operational mode and the center boost jet engine is shut down; and (ii), a second position wherein said port and starboard closure members are pivoted outwardly and in opposite directions from said parting line so as to define said air inlet's highlight and throat geometry during power assist operational modes of the aircraft when the center boost jet engine is operational.

5. A deployable air inlet as set forth in claim 4 wherein said port and starboard closure members are substantially trapezoidal in configuration having essentially parallel upper and lower edges with their leading and trailing edges slanted rearwardly and defining acute included angles with the horizontal.

6. A deployable air inlet as set forth in claim 5 wherein said closure members have a vertical dimension less than the vertical distance between said upper and lower fence means, upper and lower trim blocks telescopically mounted on said closure members with freedom for relative vertical movement with respect thereto, first biasing means for normally urging said upper trim blocks into engagement with said upper fence means, and second biasing means for normally urging said lower trim blocks into engagement with said lower fence means, whereby said trim blocks serve to fill any gaps between the upper and lower edges of said trapezoidal closure members and said upper and lower fence means at all operative positions of said closure members.

7. A deployable air inlet as set forth in claims 4 or 5 wherein said means for rotating said closure members includes synchronously and oppositely driven reversible rotary actuators passing through said pivotal connections between the stabilizer and said closure members for selectively and synchronously pivoting said closure members between closed and opened positions.

8. A deployable air inlet as set forth in claims 4 or 5 wherein said means for rotating said closure members includes synchronously and oppositely driven reversible rotary actuators for selectively and synchronously pivoting said closure members between closed and opened positions, and means for terminating pivotal movement of said closure members at any selected position ranging from fully closed through fully opened so as to permit control of said air inlet's throat area to meet operating requirements.

9. An aircraft of the type having multiple main propulsion engines, an empennage including an upstanding vertical stabilizer, and an auxiliary center boost jet engine mounted within said empennage and having a rearwardly extending exhaust nozzle and a forwardly extending air inlet duct communicating with an air inlet formed in the root leading edge of said empennage stabilizer, and comprising, in combination:

(a) an empennage including an upstanding vertical stabilizer having a generally vertically oriented leading edge and port and starboard stabilizer surface panels defining smooth aerodynamically streamlined stabilizer skin surfaces extending rearwardly from said stabilizer leading edge;

(b) port and starboard air inlet closure members respectively formed by lower leading edge quarter chord door panels defining portions of said port and starboard aerodynamically streamlined skin surfaces of said stabilizer;

(c) said port and starboard air inlet closure members defining a forwardly presented generally vertical parting line coincident with said stabilizer leading edge with said members respectively lying in the planes of said stabilizer port and starboard skin surfaces when in the closed position so as to form smooth aerodynamically streamlined continuations of said stabilizer skin surfaces extending rearwardly from said stabilizer leading edge;

(d) said port and starboard closure members having their rearmost generally vertical quarter chord door panel edges pivotally secured to said stabilizer along lines generally parallel to said stabilizer leading edge and lying in the planes of said port and starboard skin surfaces;

(e) upper and lower horizontal fence means mounted on said stabilizer with said upper fence means being positioned immediately above said closure members and said lower fence means being positioned immediately below said closure members, said upper and lower fence means fairing outwardly in a horizontal plane from said stabilizer's skin surfaces and leading edge, whereby said closure members and said upper and lower fence means define said air inlet's highlight and throat geometry and said lower fence means preclude entry of fuselage boundary layer air into said air inlet when said closure members are pivoted outwardly to their deployed positions; and, (f) means for rotating said port and starboard closure members about their pivotal connections to said stabilizer between: (i) a first position wherein the leading edges of said closure members are in abutting sealing relation along said parting line coincident with said stabilizer leading edge so as to close and seal said air inlet when said aircraft is in a cruise operational mode and said center boost jet engine is shut down; and (ii), a second position wherein said port and starboard closure members are pivoted outwardly and in opposite directions from said parting line so as to define said air inlet's highlight and throat geometry during power assist operational modes of said aircraft when said center boost jet engine is operational.

10. An aircraft as set forth in claim 9 wherein said port and starboard closure members are substantially trapezoidal in configuration having essentially parallel upper and lower edges with their leading and trailing edges slanted rearwardly and defining acute included angles with the horizontal.

11. An aircraft as set forth in claims 10 wherein said closure members have a vertical dimension less than the vertical distance between said upper and lower fence means, upper and lower trim blocks telescopically mounted on said closure members with freedom for relative vertical movement with respect thereto, first biasing means for normally urging said upper trim blocks into engagement with said upper fence means, and second biasing means for normally urging said lower trim blocks into engagement with said lower fence means, whereby said trim blocks serve to fill any gaps between the upper and lower edges of said trapezoidal closure members and said upper and lower fence means at all operative positions of said closure members.

12. An aircraft as set forth in claims 9, 10 or 11 wherein said means for rotating said closure members includes synchronously and oppositely driven reversible rotary actuators passing through said pivotal connections between said stabilizer and said closure members for selectively and synchronously pivoting said closure members between closed and opened positions.

13. An aircraft as set forth in claims 9, 10 or 11 wherein said means for rotating said closure members includes synchronously and oppositely driven reversible rotary actuators for selectively and synchronously pivoting said closure members between closed and opened positions, and means for terminating pivotal movement of said closure members at any selected position ranging from fully closed through fully opened so as to permit control of said air inlet's throat area to meet operating requirements.

14. An aircraft as set forth in claims 9, 10 or 11 wherein means are provided for optimizing the drag characteristics of said rearwardly extending exhaust nozzle when said aircraft is in a cruise operational mode and said center boost engine is shut down.

* * * * *